United States Patent
Li

(10) Patent No.: US 9,930,216 B2
(45) Date of Patent: Mar. 27, 2018

(54) PRINTING SYSTEM, COMPUTER READABLE RECORDING MEDIUM STORED WITH PRINTING DEVICE SEARCH PROGRAM, AND COMPUTER READABLE RECORDING MEDIUM STORED WITH PRINTING DEVICE CONTROL PROGRAM FOR ACQUIRING AND DISPLAYING INFORMATION WITHOUT REQUIRING CLIENT TERMINAL AUTHENTICATION

(71) Applicant: KONICA MINOLTA, INC., Chiyoda-ku, Tokyo (JP)

(72) Inventor: Xi Ngyue Li, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/045,649

(22) Filed: Feb. 17, 2016

(65) Prior Publication Data
US 2016/0248935 A1    Aug. 25, 2016

(30) Foreign Application Priority Data

Feb. 20, 2015 (JP) .................................. 2015-032278

(51) Int. Cl.
G06K 15/00    (2006.01)
G06F 3/12     (2006.01)
(Continued)

(52) U.S. Cl.
CPC ......... *H04N 1/4413* (2013.01); *G06F 3/1222* (2013.01); *G06F 3/1238* (2013.01);
(Continued)

(58) Field of Classification Search
CPC ............. H04N 1/00244; H04N 1/4413; H04N 1/4433; H04N 1/32117; G06F 3/1222;
(Continued)

(56) References Cited

U.S. PATENT DOCUMENTS 7,602,512 B2 * 10/2009 Matsueda ............. G06F 21/608
                                                    358/1.13
8,724,136 B2 *  5/2014 Yamamoto ......... H04N 1/00244
                                                    358/1.14
(Continued)

FOREIGN PATENT DOCUMENTS

JP    2011-203856 A    10/2011
JP    2014167664 A     11/2014

OTHER PUBLICATIONS

Official Notice of Reason for Refusal dated Mar. 28, 2017 by the Japanese Patent Office in corresponding JP Application No. 2015-032278 and English Translation (13 pages).

*Primary Examiner* — Gabriel Garcia
(74) *Attorney, Agent, or Firm* — Buchanan Ingersoll & Rooney PC

(57) ABSTRACT

In a printing system in which a client terminal, a server, and a plurality of printing devices are connected to one another via a network, the server has a registration unit in which authentication information of the printing devices is registered, and a transmission unit that transmits the authentication information registered in the registration unit to the client terminal, and the client terminal has a reception unit that receives the authentication information transmitted by the transmission unit, an acquisition unit that provides the printing device with the authentication information received by the reception unit thereby acquiring information regarding the printing device from the printing device, and a display unit that displays a list of information regarding the printing device acquired by the acquisition unit.

15 Claims, 9 Drawing Sheets

(51) Int. Cl.
*H04N 1/44* (2006.01)
*H04N 1/00* (2006.01)
*H04N 1/32* (2006.01)

(52) U.S. Cl.
CPC ....... *G06F 3/1288* (2013.01); *H04N 1/00244* (2013.01); *H04N 1/32117* (2013.01); *H04N 1/4433* (2013.01); *H04N 2201/0094* (2013.01)

(58) Field of Classification Search
CPC ..... G06F 3/1238; G06F 3/1288; H04L 29/06; H04L 29/08135; H04L 29/08072
USPC ........ 358/1.1, 1.13–1.18, 402; 709/201, 203, 709/217, 223, 242
See application file for complete search history.

(56) References Cited

U.S. PATENT DOCUMENTS

| | | | |
|---|---|---|---|
| 8,854,665 B2* | 10/2014 | Muranaka | G06F 3/1204 358/1.13 |
| 2011/0235115 A1 | 9/2011 | Nishio | |
| 2014/0002840 A1* | 1/2014 | Takano | G06F 3/1201 358/1.13 |

* cited by examiner

[ Printer 1 ]
 Account : Account1
 PassWord : PassWord1

[ Printer 2 ]
 Account : Account2
 PassWord : PassWord2

[ Printer 3 ]
 Account : Account3
 PassWord : PassWord3

[ Printer 4 ]
 Account : Account4
 PassWord : PassWord4

```
[ Group 1 ]
  User:
    User1
      UserName : UserName1
      PassWord : PassWord1
    User3
      UserName : UserName3
      PassWord : PassWord3
  IP:
    10.10.xx.xx
    10.30.xx.xx Printer:
    Printer1
    Printer2

[ Group 2 ]
  User:
    User2
      UserName : UserName2
      PassWord : PassWord2
    User4
      UserName : UserName4
      PassWord : PassWord4
  IP:
    10.20.xx.xx
    10.40.xx.xx Printer:
    Printer3
    Printer4

...
```

PRINTING SYSTEM, COMPUTER READABLE RECORDING MEDIUM STORED WITH PRINTING DEVICE SEARCH PROGRAM, AND COMPUTER READABLE RECORDING MEDIUM STORED WITH PRINTING DEVICE CONTROL PROGRAM FOR ACQUIRING AND DISPLAYING INFORMATION WITHOUT REQUIRING CLIENT TERMINAL AUTHENTICATION

CROSS-REFERENCE TO RELATED APPLICATION

This application is based on Japanese Patent Application No. 2015-032278 filed on Feb. 20, 2015, the contents of which are incorporated herein by reference.

BACKGROUND

1. Technical Field

The present invention relates to a printing system, a computer readable recording medium stored with a printing device search program, and a computer readable recording medium stored with a printing device control program.

2. Description of Related Arts

In recent years, there has been proposed a printer driver (Universal Printer Driver: UPD) common to a plurality of types of printers, which can cope with the plurality of types of printers by one printer driver and can select an output destination printer whenever printing is performed.

PC (Personal Computer) having the UPD installed therein searches for printers existing on a network when the UPD is started. Then, the PC acquires information from each printer on the network and displays a list of the information on a display (for example, Japanese Unexamined Patent Application Publication No. 2011-203856). For communication between the PC and the printers, a protocol such as SNMP (Simple Network Management Protocol) is used.

And now, SNMP v3, which is version 3 of the SNMP, has a user authentication function. Therefore, in order for the PC to acquire information from a printer corresponding to the SNMP v3, the PC needs to have authentication information of the printer.

However, for example, there is a case in which the PC is not able to have the authentication information of the printer such as the case of performing printing by connecting a network of a business destination. In this regard, it is desired that the PC is able to acquire information from the printer on a network and display a list of the information even though the PC does not have the authentication information of the printer.

SUMMARY

The present invention has been accomplished in view of the above problem. Accordingly, objectives of the present invention are to provide a printing system, a computer readable recording medium stored with a printing device search program, and a computer readable recording medium stored with a printing device control program, which enable a client terminal such as PC to acquire information from a printing device and display a list of the information even though the client terminal does not have authentication information of the printing device.

In order to achieve at least one of the aforementioned objectives, a printing system, reflecting one aspect of the present invention, is a printing system in which a client terminal, a server, and a plurality of printing devices are connected to one another via a network, wherein the server includes: a printing device registration unit in which authentication information of the plurality of printing devices is registered; and a server-side transmission unit configured to transmit the authentication information registered in the printing device registration unit to the client terminal in response to a request from the client terminal, and the client terminal includes: a terminal-side reception unit configured to receive the authentication information transmitted by the server-side transmission unit; a device information acquisition unit configured to provide the printing device with the authentication information received by the terminal-side reception unit, thereby acquiring information regarding the printing device from the printing device; and a display unit configured to display a list of the information regarding the printing device acquired by the device information acquisition unit.

In the aforementioned printing system, preferably, the client terminal further includes: a terminal-side transmission unit configured to transmit identification information of the client terminal to the server, and the server further includes: an identification information registration unit in which identification information of a client terminal and identification information of a printing device permitted to be used by the client terminal are associated with each other and registered; a server-side reception unit configured to receive the identification information of the client terminal transmitted by the terminal-side transmission unit; and a recognition unit configured to recognize the identification information of the printing device associated with the identification information of the client terminal received by the server-side reception unit with reference to the identification information registration unit, wherein the server-side transmission unit transmits, to the client terminal, the authentication information of the printing device having the identification information recognized by the recognition unit.

In the aforementioned printing system, preferably, the identification information of the client terminal is classified into predetermined groups, and in the identification information registration unit, identification information of a client terminal belonging to each group and identification information of a printing device permitted to be used by the client terminal belonging to a corresponding group are associated with each other and registered in units of predetermined groups.

In the aforementioned printing system, preferably, the client terminal further includes: a user information acquisition unit configured to acquire user information of the client terminal, and the terminal-side transmission unit transmits the user information acquired by the user information acquisition unit to the server as the identification information of the client terminal.

In the aforementioned printing system, preferably, the client terminal further includes: an address acquisition unit configured to acquire an IP address of the client terminal, and the terminal-side transmission unit transmits the IP address acquired by the address acquisition unit to the server as the identification information of the client terminal.

In the aforementioned printing system, preferably, the client terminal further includes: a determination unit configured to determine whether the printing device is a printing device requiring authentication, and when the determination unit determines that the printing device is a printing device requiring no authentication, the device information acquisition unit acquires information regarding the printing device from the printing device without providing the printing device with the authentication information, and the display unit displays a list of both information regarding the printing device requiring authentication and information regarding the printing device requiring no authentication.

The objectives, features, and characteristics of this invention other than those set forth above will become apparent from the description given herein below with reference to preferred embodiments illustrated in the accompanying drawings.

BRIEF DESCRIPTION OF THE DRAWINGS

FIG. 6 is a diagram illustrating an example of authentication information.

FIG. 7 is a diagram illustrating an example of group information.

DETAILED DESCRIPTION

The embodiments of this invention will be described below with reference to the accompanying drawings.

Figure 1:
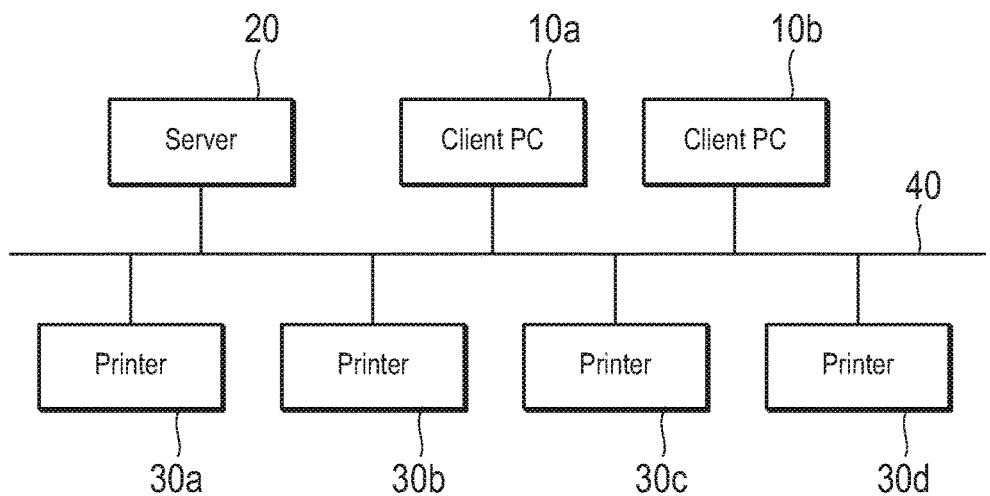
FIG. 1 is a block diagram illustrating an entire configuration of a printing system according to an embodiment of the present invention.

FIG. 1 is a block diagram illustrating an entire configuration of a printing system according to an embodiment of the present invention. As illustrated in FIG. 1, the printing system includes client PCs 10a and 10b (hereinafter, generally referred to as a client PC 10), a server 20, and printers 30a to 30d (hereinafter, generally referred to as a printer 30). The client PCs 10a and 10b, the server 20, and the printers 30a to 30d are communicably connected to one another via a network 40.

The network 40, for example, includes various networks such as a LAN (Local Area Network) obtained by connecting computers and network devices to one another by standards such as Ethernet, FDDI (Fiber Distributed Data Interface), and Wi-Fi (Wireless Fidelity), or a WAN (Wide Area Network) obtained by connecting LANs to one another by dedicated lines. In addition, the type and the number of devices connected to the network 40 are not limited to the example illustrated in FIG. 1. Furthermore, the printers 30a to 30d include MFP (Multi-Function Peripheral).

Figure 2:
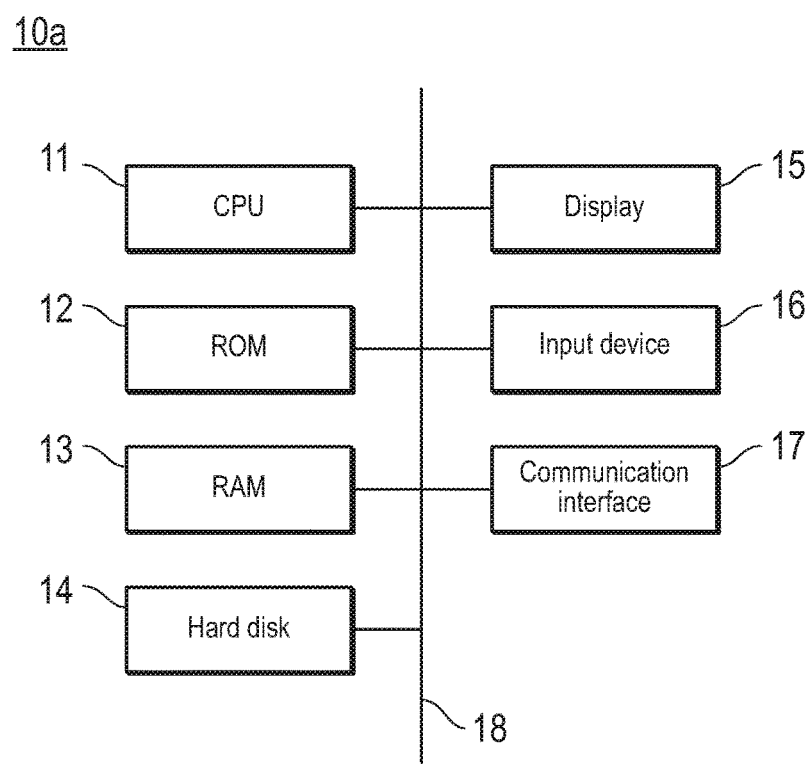
FIG. 2 is a block diagram illustrating a schematic configuration of a client PC.

FIG. 2 is a block diagram illustrating a schematic configuration of the client PC 10a. Since the client PCs 10a and 10b serving as client terminals have configurations similar to each other, the client PC 10a will be representatively described below.

The client PC 10a includes a CPU (Central Processing Unit) 11, a ROM (Read Only Memory) 12, a RAM (Random Access Memory) 13, a hard disk 14, a display 15, an input device 16, and a communication interface 17, and these elements are connected to one another via a bus 18 for exchanging signals.

The CPU 11 performs control of the aforementioned each element and various calculation processes according to programs. The ROM 12 stores various programs and various types of data. The RAM 13 is a work area and temporarily stores programs and data.

The hard disk 14 stores various programs including an operating system (OS) and various types of data. In the hard disk 14, a document file creating application for creating a document file and UPD, which is a printer driver common to a plurality of types of printers, have been installed.

The display 15, for example, is a liquid crystal display and displays various types of information. The input device 16 includes a pointing device such as a mouse and a keyboard, and is used in order to perform various types of input.

The communication interface 17 is an interface for communicating with other devices via the network 40, and standards such as Ethernet, FDDI, and Wi-Fi are used. The communication interface 17 serves as terminal-side transmission unit and reception unit and exchanges information with the server 20.

Figure 3:
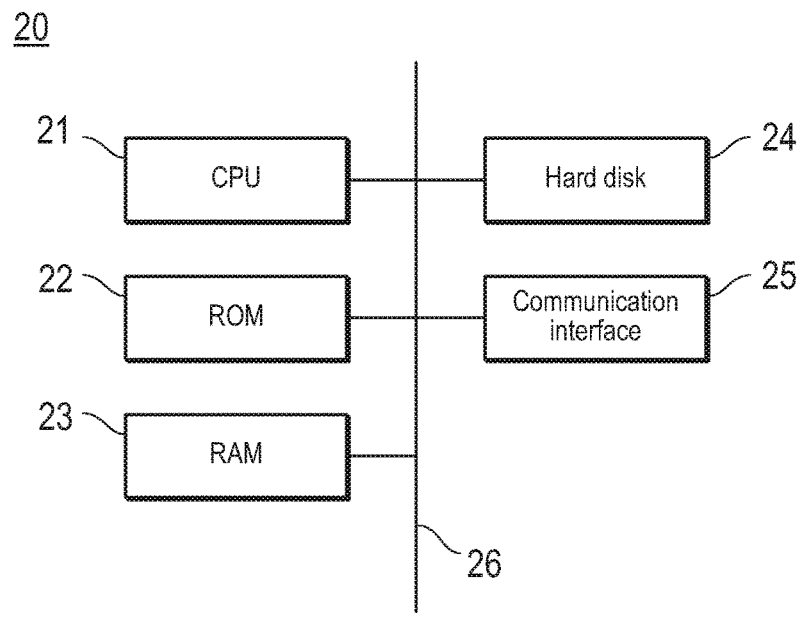
FIG. 3 is a block diagram illustrating a schematic configuration of a server.

FIG. 3 is a block diagram illustrating a schematic configuration of the server 20. The server 20 includes a CPU 21, a ROM 22, a RAM 23, a hard disk 24, and a communication interface 25, and these elements are connected to one another via a bus 26 for exchanging signals. In addition, since the aforementioned each element of the server 20 has functions similar to those of the aforementioned each element of the client PC 10a, a description thereof will be omitted. The communication interface 25 serves as server-side transmission unit and reception unit and exchanges information with the client PCs 10a and 10b.

Figure 4:
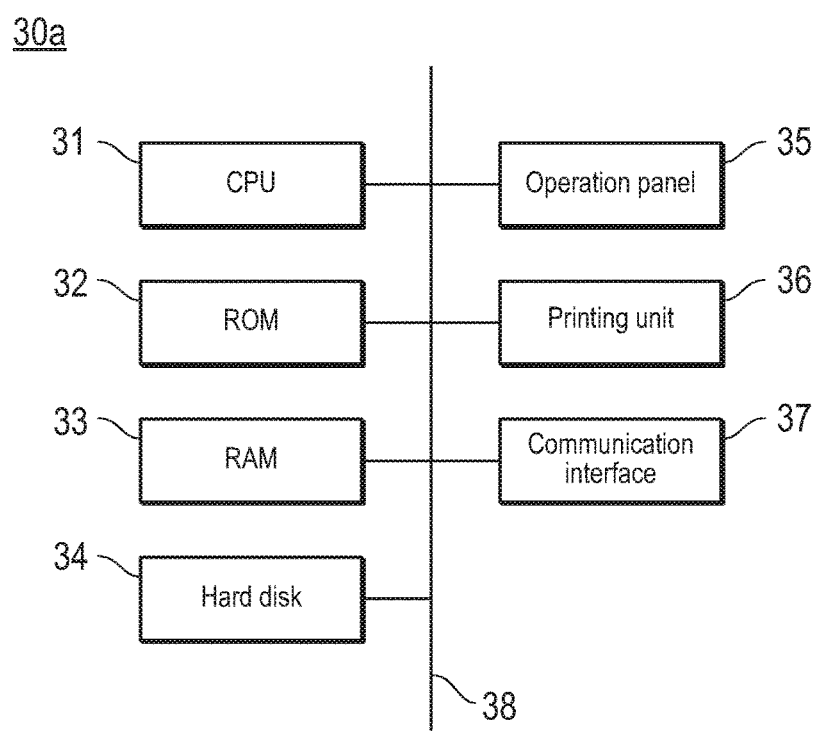
FIG. 4 is a block diagram illustrating a schematic configuration of a printer.

FIG. 4 is a block diagram illustrating a schematic configuration of the printer 30a. Since the printers 30a to 30d serving as printing devices have configurations similar to one another, the printer 30a will be representatively described below.

The printer 30a includes a CPU 31, a ROM 32, a RAM 33, a hard disk 34, an operation panel 35, a printing unit 36, and a communication interface 37, and these elements are connected to one another via a bus 38 for exchanging signals. In addition, among the aforementioned elements of the printer 30a, parts having functions similar to those of the aforementioned elements of the client PC 10a will not be described.

The operation panel 35 is used for the display of various types of information and the input of various instructions. The printing unit 36 prints an image based on various types of data on a recording sheet such as a paper by using a well-known image creating process such as an electrophotographic process.

The printer 30a of the present embodiment corresponds to the SNMP v3 and is provided with MIB (Management Information Base) that stores apparatus information of the printer 30a. When the client PC 10a accesses the printer 30a in which the SNMP v3 is valid, the client PC 10a needs to perform authentication by providing the printer 30a with authentication information.

Figure 5:
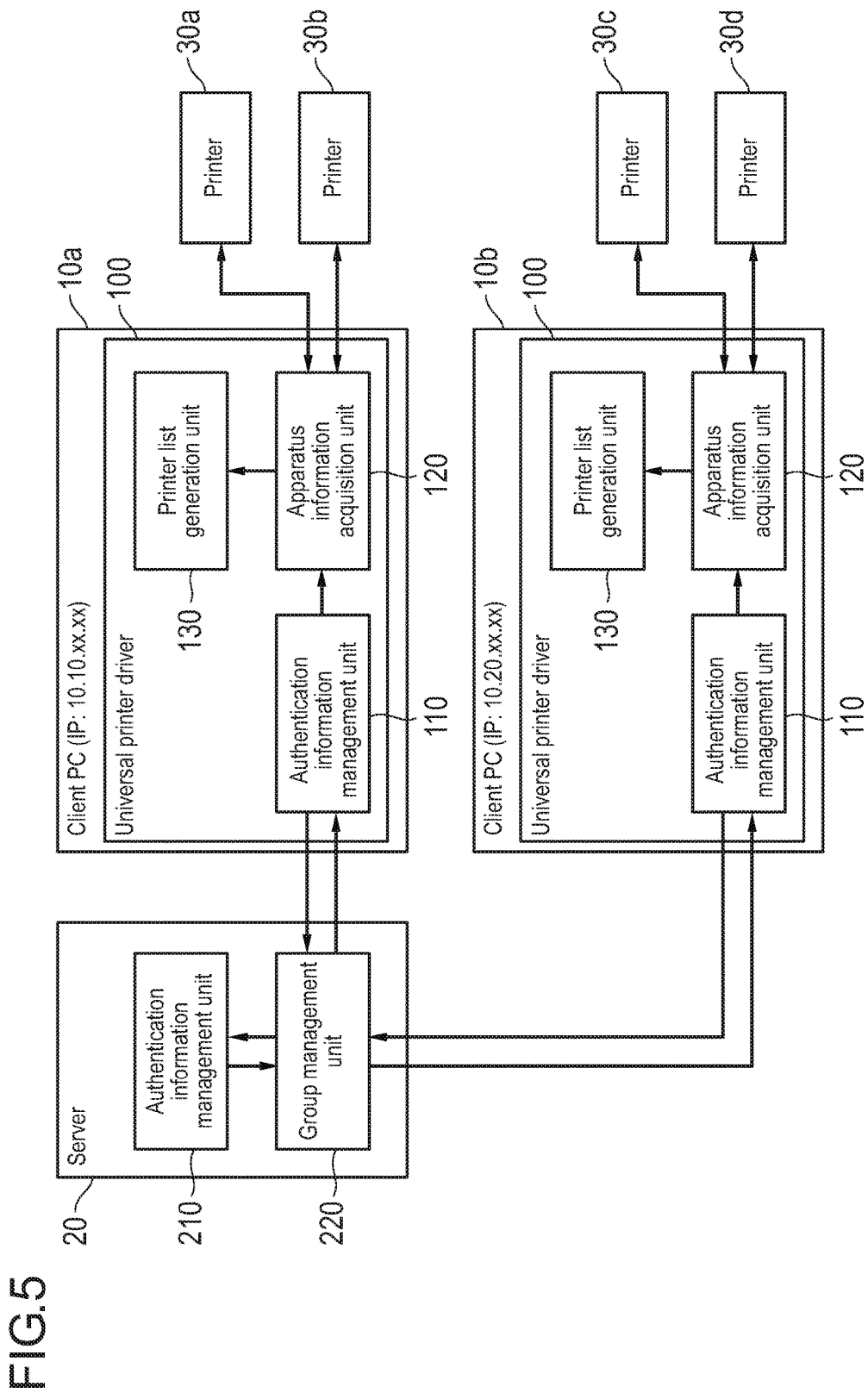
FIG. 5 is a diagram illustrating software configurations of a client PC and a server.

FIG. 5 is a diagram illustrating software configurations of the client PCs 10a and 10b and the server 20. As described above, a UPD 100 has been installed in the client PCs 10a and 10*b*, and the client PCs 10*a* and 10*b* communicate with the server 20 and the printers 30*a* to 30*d*.

As illustrated in FIG. 5, the client PCs 10*a* and 10*b* include an authentication information management unit 110, an apparatus information acquisition unit 120, and a printer list generation unit 130, respectively. The functions of the authentication information management unit 110, the apparatus information acquisition unit 120, and the printer list generation unit 130 are performed when the CPU 11 executes programs of the UPD 100.

The authentication information management unit 110 manages authentication information of the printer 30. The authentication information management unit 110 manages the authentication information of the printer 30 received from the server 20.

The apparatus information acquisition unit 120 acquires apparatus information of the printer 30. The apparatus information acquisition unit 120 serves as a device information acquisition unit, and acquires the apparatus information from the printer 30 by using the authentication information managed by the authentication information management unit 110. Furthermore, the apparatus information acquisition unit 120 serves as a determination unit and determines whether a specific printer 30 is a printer that requires authentication.

The printer list generation unit 130 generates a list of the apparatus information of the printer 30. The list of the apparatus information is displayed on the display 15 serving as a display unit.

The server 20 includes an authentication information management unit 210 and a group management unit 220. The functions of the authentication information management unit 210 and the group management unit 220 are performed when the CPU 21 executes programs stored in the hard disk 24 of the server 20.

The authentication information management unit 210 manages the authentication information of the printer 30 existing on the network 40. In the authentication information management unit 210 serving as a printing device registration unit, the authentication information of the printer 30 existing on the network 40 has been registered.

FIG. 6 is a diagram illustrating an example of authentication information 300 managed by the authentication information management unit 210. In the authentication information management unit 210, accounts and passwords of the printer 30 have been registered as the authentication information 300 of the printer 30. A manager of the server 20 performs registration, deletion, and change of the authentication information 300 to the authentication information management unit 210.

The group management unit 220 divides the client PC 10 into a plurality of groups for management. In the group management unit 220 serving as an identification information registration unit, identification information of the client PC 10 belonging to each group and identification information of the printer 30 permitted to be used by the client PC 10 of each group have been associated with each other and have been registered in units of predetermined groups (for example, in units of affiliated departments). Furthermore, the group management unit 220 serves as a recognition unit and recognizes the identification information of the printer 30 permitted to be used by the client PC 10 from the identification information of the client PC 10.

FIG. 7 is a diagram illustrating an example of group information 400 managed by the group management unit 220. In the group management unit 220, user names and passwords of the client PC 10 and IP addresses (Internet Protocol addresses) of the client PC 10 have been registered as the identification information of the client PC 10 belonging to each group. Furthermore, in the group management unit 220, names of the printer 30 have been registered as the identification information of the printer 30 permitted to be used by the client PC 10 of each group. The manager of the server 20 performs registration, deletion, and change of the group information 400 to the group management unit 220.

In addition, the client PCs 10*a* and 10*b*, the server 20, and the printers 30*a* to 30*d* may also include elements other than the aforementioned elements, or may not also include a part of the aforementioned elements.

In the printing system configured as above, for example, when a user of the client PC 10*a* performs printing by starting the UPD 100, the client PC 10*a* searches for the printer 30 existing on the network 40 and displays a list of the apparatus information of the printer 30. Hereinafter, with reference to FIG. 8 to FIG. 11, operations of the client PC 10 and the server 20 in the printing system will be described.

Firstly, with reference to FIG. 8 to FIG. 10, the operation of the client PC 10 will be described.

Figure 8:
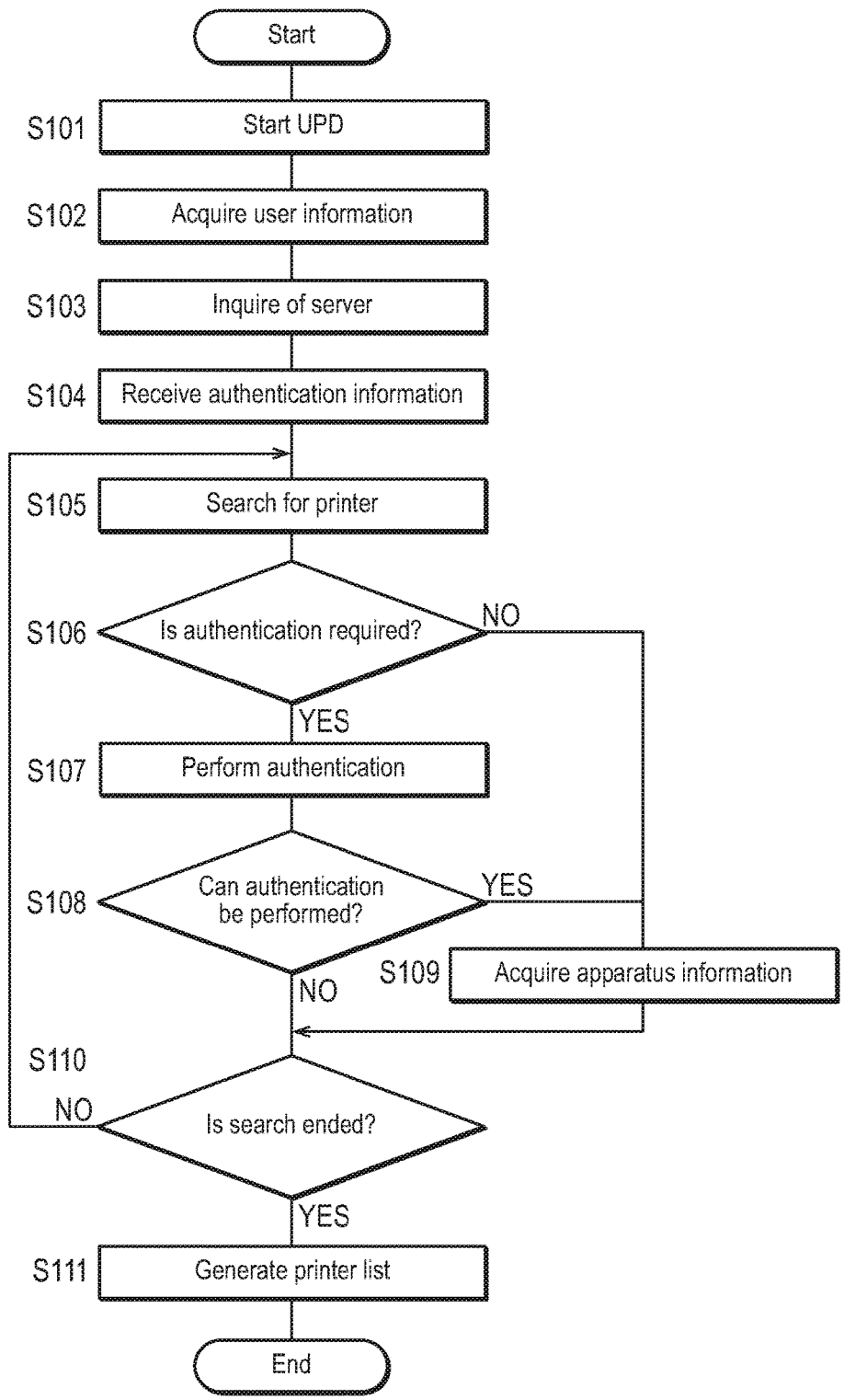
FIG. 8 is a flowchart illustrating the procedure of a printing device search process.
Figure 9:
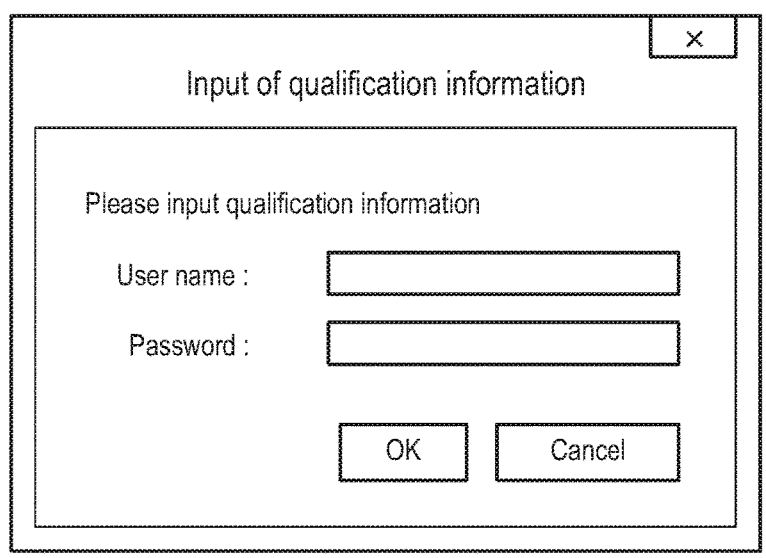
FIG. 9 is a diagram illustrating an example of a user information input screen.

FIG. 8 is a flowchart illustrating the procedure of a printing device search process which is performed by the client PC 10*a*. In addition, the algorithm indicated by the flowchart of FIG. 8 has been stored in the hard disk 14 of the client PC 10*a* as a program and is executed by the CPU 11.

Firstly, the client PC 10*a* starts the UPD 100 (step S101). In more detail, the client PC 10*a*, for example, starts the UPD 100 in response to a print instruction from a user.

Next, the client PC 10*a* acquires user information (step S102). In more detail, firstly, the client PC 10*a* displays a user information input screen 500 (see FIG. 9) on the display 15, and prompts a user to input a user name and a password. Then, the client PC 10*a* acquires the user name and the password input by the user as the user information.

Next, the client PC 10*a* inquires of the server 20 (step S103). In more detail, the client PC 10*a* transmits the user information acquired in the process of step S102 to the server 20 to request the authentication information of the printer 30 existing on the network 40. The server 20 having received the user information firstly specifies a group including the client PC 10*a* from the user information. Then, the server 20 transmits the authentication information of the printer 30, which is permitted to be used by the client PC 10 of the specified group, to the client PC 10*a*.

Next, the client PC 10*a* receives the authentication information (step S104). In more detail, the client PC 10*a* receives the authentication information of the printer 30 which is permitted to be used by the client PC 10*a*. The received authentication information of the printer 30 has been transmitted from the server 20 in response to the user information transmitted to the server 20 in the process of step S103.

Next, the client PC 10*a* searches for the printer 30 existing on the network 40 (step S105). In more detail, the client PC 10*a* searches for one printer 30 existing on the network 40 by using a search function of the UPD 100.

Next, the client PC 10*a* determines whether authentication is required (step S106). In more detail, the client PC 10*a* determines whether the one printer 30 searched in the process of step S105 is a printer that requires authentication in order to acquire apparatus information.

When it is determined that the authentication is not required (step S106: NO), the client PC 10*a* acquires the apparatus information (step S109). In more detail, the client PC 10*a* accesses the one printer 30 searched in the process of step S105 without providing authentication information, and acquires the apparatus information from the printer 30.

On the other hand, when it is determined that the authentication is required (step S106: YES), the client PC 10a performs the authentication (step S107). In more detail, the client PC 10a provides the authentication information received in the process of step S104 to the one printer 30 searched in the process of step S105, thereby performing authentication by the printer 30.

Next, the client PC 10a determines whether authentication can be performed (step S108). In more detail, the client PC 10a determines whether authentication by the printer 30 has been succeeded. For example, when the client PC 10a does not receive authentication information of the searched printer 30 from the server 20 or when there is an error in the authentication information received in the client PC 10a, the authentication is not succeeded.

When it is determined that the authentication cannot be performed (step S108: NO), the client PC 10a proceeds to a process of step S110.

On the other hand, when it is determined that the authentication can be performed (step S108: YES), the client PC 10a acquires the apparatus information (step S109). In more detail, the client PC 10a accesses the one printer 30 searched in the process of step S105, and acquires the apparatus information from the printer 30.

Next, the client PC 10a determines whether the search has been ended (step S110). In more detail, the client PC 10a determines whether the search of all printers 30 existing on the network 40 has been ended.

When it is determined that the search has not been ended (step S110: NO), the client PC 10a returns to the process of step S105. Then, the client PC 10a repeats the processes of steps S105 to S110 until the search of all the printers 30 existing on the network 40 is ended.

On the other hand, when it is determined that the search has been ended (step S110: YES), the client PC 10a generates a printer list (step S111), and ends the procedure. In more detail, the client PC 10a generates a list of the apparatus information acquired in the process of step S109, displays the list on the display 15, and ends the procedure.

As described above, according to the procedure of the flowchart illustrated in FIG. 8, firstly, the client PC 10a requests the server 20 to transmit the authentication information of the printer 30, and receives the authentication information transmitted from the server 20 in response to the request. Then, the client PC 10a acquires the apparatus information from the printer 30 by using the received authentication information, and displays a list of the acquired apparatus information on the display 15. According to such a configuration, even though the client PC 10a has no authentication information of the printer 30, the client PC 10a is able to acquire the apparatus information from the printer 30 on the network 40 and display a list of the apparatus information.

Figure 10:
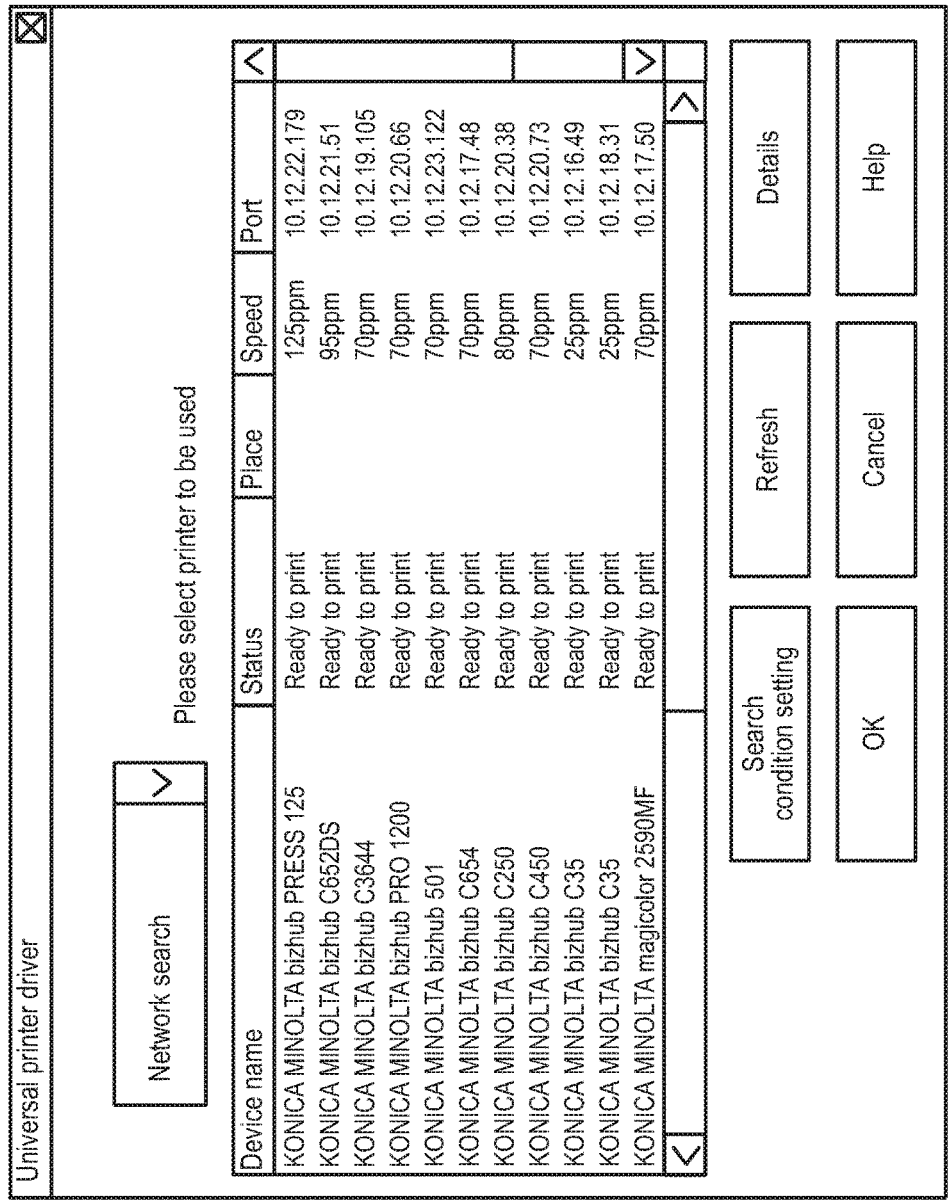
FIG. 10 is a diagram illustrating an example of an output device search screen.

FIG. 10 is a diagram illustrating an example of an output device search screen 600 displayed on the display 15 of the client PC 10a. On the output device search screen 600, a list of the apparatus information of the printer 30 existing on the network 40 is displayed. In the present embodiment, a list of both apparatus information of the printer 30 requiring no authentication and apparatus information of the printer 30 having succeeded in authentication is displayed. The apparatus information includes name information, status information, place information, speed information, and port information of the printer 30.

A user of the client PC 10a can select one printer from printers displayed on a list with reference to the output device search screen 600, and instruct printing. At this time, separately from authentication for acquiring apparatus information from the printer 30, authentication for performing printing can be performed.

In addition, in the procedure of the aforementioned flowchart illustrated in FIG. 8, the client PC 10a searches for the printer 30 on the network 40 one by one and acquires apparatus information. However, the client PC 10a may initially search for all printers on the network 40 and may sequentially acquire apparatus information from a plurality of searched printers 30.

Next, with reference to FIG. 11, the operation of the server 20 will be described. The server 20 of the present embodiment manages the printer 30 on the network 40. The server 20 transmits authentication information to the client PC 10, thereby allowing the client PC 10 to access the printer 30 to acquire apparatus information and display a list of the apparatus information.

Figure 11:
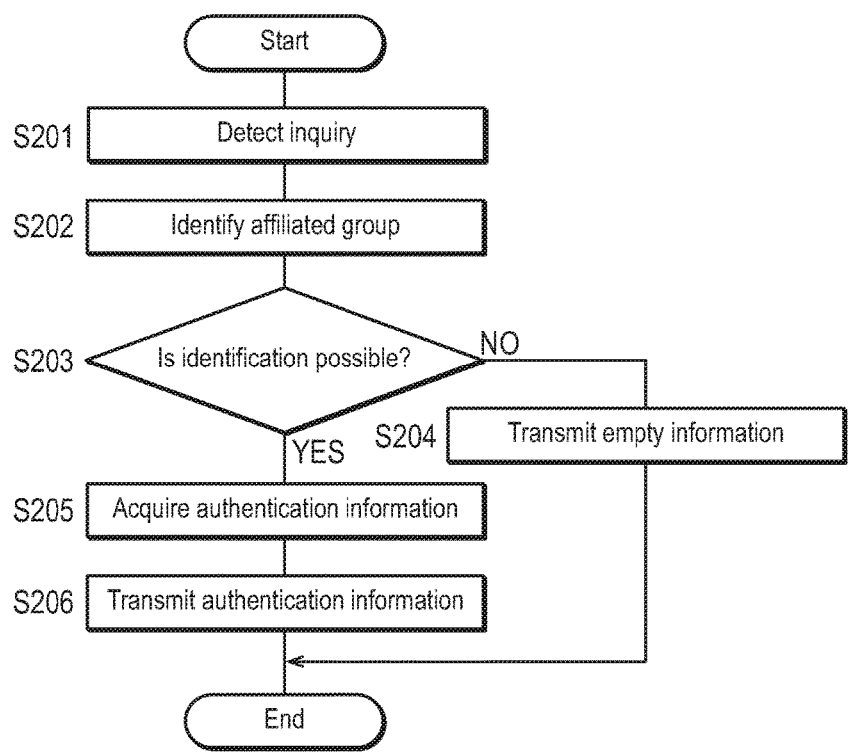
FIG. 11 is a flowchart illustrating the procedure of a printing device control process.

FIG. 11 is a flowchart illustrating the procedure of a printing device control process which is performed by the server 20. In addition, the algorithm indicated by the flowchart of FIG. 11 has been stored in the hard disk 24 of the server 20 as a program and is executed by the CPU 21.

Firstly, the server 20 detects an inquiry from the client PC 10a (step S201). In more detail, the server 20 detects the inquiry made by the client PC 10a in the process of step S103 of FIG. 8. At this time, the server 20 receives the user information (the user name and the password) transmitted from the client PC 10a.

Next, the server 20 identifies a group including the client PC 10a (step S202). In more detail, the server 20 specifies the group including the client PC 10a from the user information received in the process of step S201 with reference to the group information 400 (see FIG. 7) managed by the group management unit 220. For example, when the user information is a user name "UserName 1" and a password "PassWord 1", the server 20 specifies a "group 1" as the group including the client PC 10a.

Next, the server 20 determines whether it is possible to identify a group (step S203). For example, when the user information of the client PC 10a has not been registered in any group, the server 20 determines that it is not possible to identify the group.

When it is determined that it is not possible to identify the group (step S203: NO), the server 20 transmits empty information to the client PC 10a (step S204), and ends the procedure.

On the other hand, when it is determined that it is possible to identify the group (step S203: YES), the server 20 acquires authentication information (step S205). In more detail, the server 20 firstly recognizes a name of the printer 30, which is permitted to be used by the client PC 10 of the group specified in the process of step S202, with reference to the group information 400 managed by the group management unit 220. Then, the server 20 extracts the authentication information of the printer 30 having the recognized name from the authentication information 300 (see FIG. 6) managed by the authentication information management unit 210. For example, when the group including the client PC 10a is the "group 1", the server 20 firstly recognizes a "printer 1" and a "printer 2" as the name of the printer 30 permitted to be used by the client PC 10 of the "group 1". Thereafter, the server 20 extracts authentication information of the "printer 1" and the "printer 2" from the authentication information 300 managed by the authentication information management unit 210.

Then, the server 20 transmits the authentication information to the client PC 10a (step S206), and ends the procedure. In more detail, the server 20 transmits the authentication information acquired in the process of step S205 to the client PC 10a, and ends the procedure.

As described above, according to the procedure of the flowchart illustrated in FIG. 11, the server 20 specifies a group including the client PC 10a from the user information of the client PC 10a, and recognizes the name of a printer permitted to be used by the client PC 10 of the specified group. Then, the server 20 acquires the authentication information of the printer 30 having the recognized name and transmits the acquired authentication information to the client PC 10a.

As described above, according to the printing system of the present embodiment, the authentication information of the printer 30 existing on the network 40 is registered in and managed by the server 20. Then, in response to a request from the client PC 10, the authentication information is transmitted from the server 20 to the client PC 10. According to such a configuration, even though the client PC 10 has no authentication information of the printer 30, the client PC 10 is able to acquire apparatus information from the printer 30 on the network 40 and display a list of the apparatus information. Furthermore, according to the printing system of the present embodiment, since the client PC 10 performs authentication by automatically providing authentication information to the printer 30, a user of the client PC 10 does not need to input the authentication information.

Moreover, according to the printing system of the present embodiment, it is possible to classify the client PC 10 into a plurality of groups and manage the printer 30, which is permitted to be used by the client PC 10, in units of groups to which the client PC 10 belongs.

In addition, in the aforementioned embodiment, the client PC 10a transmits the user information of the client PC 10a to the server 20 as the identification information of the client PC 10a. However, the client PC 10a may also transmit the IP address of the client PC 10a to the server 20 as the identification information of the client PC 10a.

In this case, for example, when the server 20 simultaneously manages printers 30 of a plurality of branches, the branches are employed as a group unit and printers 30 permitted to be used by an IP address assigned to each branch are registered. According to such a configuration, even when a user has visited another branch, it is possible to provide the client PC 10 with authentication information of an appropriate printer 30 by employing the IP address as identification information. On the other hand, when the server 20 exists in each branch, if an IP address of the server 20 (an inquiry destination) is just designated, it is possible to provide the client PC 10 with authentication information of an appropriate printer 30 by employing the IP address as identification information.

In addition, the CPU 11 of the client PC 10 serves as a user information acquisition unit that acquires user information, or an address acquisition unit that acquires an IP address.

The present invention is not limited only to the aforementioned embodiment, and can be variously modified within the scope of the accompanying claims.

For example, in the aforementioned embodiment, as the identification information of the client PC 10, any one of the user information and the IP address is used. However, a combination of both the user information and the IP address may also be used.

A unit and a method for performing various processes in the printing system according to the aforementioned embodiment can also be realized by any one of a dedicated hardware circuit or a programmed computer. The aforementioned program, for example, may also be provided by a computer-readable recording medium such as a flexible disk and CD-ROM (Compact Disc Read Only Memory), or may also be provided on-line via a network such as the Internet. In this case, the program recorded on the computer-readable recording medium is typically transmitted to and stored in a storage unit such as a hard disk. Furthermore, the aforementioned program may also be provided as single application software, or may also be incorporated in software of a printing system as one function of the printing system.

What is claimed is:

1. A printing system in which a client terminal, a server, and a plurality of printing devices are connected to one another via a network, wherein
the server comprises:
    a server central processing unit (CPU) in which authentication information of the plurality of printing devices is registered; and
    a server-side communication interface configured to transmit, to the client terminal, the authentication information of the plurality of printing devices registered in the server central processing unit (CPU), wherein said transmission to the client terminal is in response to a request from the client terminal requesting the authentication information,
the client terminal comprises:
    a terminal-side communication interface configured to receive the authentication information transmitted by the server-side communication interface;
    a client terminal CPU configured to provide the printing device with the authentication information received by the terminal-side communication interface, thereby acquiring information regarding the printing device from the printing device; and
    a display configured to display a list of the information regarding the printing device acquired by the client terminal CPU,
wherein:
the terminal-side communication interface is further configured to transmit identification information of the client terminal to the server,
the server CPU (i) associates identification information of a client terminal and identification information of a printing device permitted to be used by the client terminal with each other and (ii) registers the identification information of the client terminal and the identification information of the printing device;
the server-side communication interface is further configured to receive the identification information of the client terminal transmitted by the terminal-side communication interface,
the server CPU is further configured to recognize the identification information of the printing device associated with the identification information of the client terminal received by the server-side communication interface, and
the server-side communication interface transmits, to the client terminal, the authentication information of the printing device having the identification information recognized by the recognition unit.

2. The printing system as claimed in claim 1, wherein
the identification information of the client terminal is classified into predetermined groups, and
in the server CPU, identification information of a client terminal belonging to each group and identification information of a printing device permitted to be used by the client terminal belonging to a corresponding group are associated with each other and registered in units of predetermined groups.

3. The printing system as claimed in claim 1, wherein
the client terminal CPU is configured to acquire user information of the client terminal, and
the terminal-side communication interface transmits the user information acquired by the client terminal CPU to the server as the identification information of the client terminal.

4. The printing system as claimed in claim 1, wherein
the client terminal CPU is configured to acquire an IP address of the client terminal, and
the terminal-side communication interface transmits the IP address acquired by the address acquisition unit to the server as the identification information of the client terminal.

5. A printing system in which a client terminal, a server, and a plurality of printing devices are connected to one another via a network, wherein
the server comprises:
a server central processing unit (CPU) in which authentication information of the plurality of printing devices is registered; and
a server-side communication interface configured to transmit, to the client terminal, the authentication information of the plurality of printing devices registered in the server central processing unit (CPU), wherein said transmission to the client terminal is in response to a request from the client terminal requesting the authentication information,
the client terminal comprises:
a terminal-side communication interface configured to receive the authentication information transmitted by the server-side communication interface;
a client terminal CPU configured to provide the printing device with the authentication information received by the terminal-side communication interface, thereby acquiring information regarding the printing device from the printing device; and
a display configured to display a list of the information regarding the printing device acquired by the client terminal CPU,
wherein
the client terminal CPU is configured to determine whether the printing device is a printing device requiring authentication, and
when the client terminal CPU determines that the printing device is a printing device requiring no authentication, the client terminal CPU acquires information regarding the printing device from the printing device without providing the printing device with the authentication information, and
the display displays a list of both information regarding the printing device requiring authentication and information regarding the printing device requiring no authentication.

6. A non-transitory computer readable recording medium stored with a printing device search program executed by a client terminal in a printing system in which the client terminal, a server, and a plurality of printing devices are connected to one another via a network, the program causing the client terminal to execute a process comprising the steps of:
(a) requesting the server to transmit authentication information of the plurality of printing devices registered in the server;
(b) receiving the authentication information of the plurality of printing devices transmitted from the server in response to the request of the authentication information;
(c) providing the printing device with the authentication information received in the step (b) and acquiring information regarding the printing device from the printing device; and
(d) displaying a list of the information regarding the printing device acquired in the step (c) on a display, wherein
in the server, identification information of a client terminal and identification information of a printing device permitted to be used by the client terminal are associated with each other and registered,
in the step (a), the identification information of the client terminal is transmitted to the server to request the authentication information, and
in the step (b), the authentication information of a printing device whose identification information is associated with the identification information of the client terminal transmitted to the server in the step (a), is received.

7. The non-transitory computer readable recording medium as claimed in claim 6, wherein
the identification information of the client terminal is classified into predetermined groups, and
in the server, identification information of a client terminal belonging to each group and identification information of a printing device permitted to be used by the client terminal belonging to a corresponding group are associated with each other and registered in units of predetermined groups.

8. The non-transitory computer readable recording medium as claimed in claim 6, wherein
the process further comprises:
(e) acquiring user information of the client terminal, and
in the step (a), the user information acquired in the step (e) is transmitted to the server as the identification information of the client terminal.

9. The non-transitory computer readable recording medium as claimed in claim 6, wherein
the process further comprises:
(f) acquiring an IP address of the client terminal, and
in the step (a), the IP address acquired in the step (f) is transmitted to the server as the identification information of the client terminal.

10. A non-transitory computer readable recording medium stored with a printing device search program executed by a client terminal in a printing system in which the client terminal, a server, and a plurality of printing devices are connected to one another via a network, the program causing the client terminal to execute a process comprising the steps of:
(a) requesting the server to transmit authentication information of the plurality of printing devices registered in the server;
(b) receiving the authentication information of the plurality of printing devices transmitted from the server in response to the request of the authentication information;

(c) providing the printing device with the authentication information received in the step (b) and acquiring information regarding the printing device from the printing device; and
(d) displaying a list of the information regarding the printing device acquired in the step (c) on a display, wherein the process further comprises:

(g) determining whether the printing device is a printing device requiring authentication, and
(h) acquiring information regarding the printing device from the printing device without providing the printing device with the authentication information when it is determined in the step (g) that the printing device is a printing device requiring no authentication,
in the step (d), a list of both information regarding the printing device requiring authentication and information regarding the printing device requiring no authentication is displayed.

11. A non-transitory computer readable recording medium stored with a printing device control program executed by a server in a printing system in which a client terminal, the server, and a plurality of printing devices are connected to one another via a network, the program causing the server to execute a process comprising the steps of:

(a) receiving, from the client terminal, a request for authentication information of the plurality of printing devices, wherein the request is detected and identification information of the client terminal is received;
(b) transmitting authentication information of the plurality of printing devices registered in a central processing unit (CPU) of a server to the client terminal in response to the request received in the step (a), thereby allowing the client terminal to access the printing device to acquire information regarding the printing device and display a list of the information regarding the printing device; and
(c) recognizing identification information of a printing device associated with the identification information of the client terminal received in the step (a), with reference to the server CPU, in which identification information of a client terminal and identification information of a printing device permitted to be used by the client terminal are associated with each other and registered, wherein, in the step (b), the authentication information of the printing device having the identification information recognized in the step (c) is transmitted to the client terminal.

12. The non-transitory computer readable recording medium as claimed in claim 11, wherein
the identification information of the client terminal is classified into predetermined groups, and
in the server CPU, identification information of a client terminal belonging to each group and identification information of a printing device permitted to be used by the client terminal belonging to a corresponding group are associated with each other and registered in units of predetermined groups.

13. The non-transitory computer readable recording medium as claimed in claim 11, wherein
in the step (a), user information of the client terminal is received as the identification information of the client terminal.

14. The non-transitory computer readable recording medium as claimed in claim 11, wherein
in the step (a), an IP address of the client terminal is received as the identification information of the client terminal.

15. A non-transitory computer readable recording medium stored with a printing device control program executed by a server in a printing system in which a client terminal, the server, and a plurality of printing devices are connected to one another via a network, the program causing the server to execute a process comprising the steps of:

(a) receiving, from the client terminal, a request for authentication information of the plurality of printing devices; and
(b) transmitting authentication information of the plurality of printing devices registered in a central processing unit (CPU) of a server to the client terminal in response to the request received in the step (a), thereby allowing the client terminal to access the printing device to acquire information regarding the printing device and display a list of the information regarding the printing device, wherein
the client terminal displays a list of both information regarding the printing device requiring authentication and information regarding the printing device requiring no authentication.

* * * * *